Patented May 30, 1950

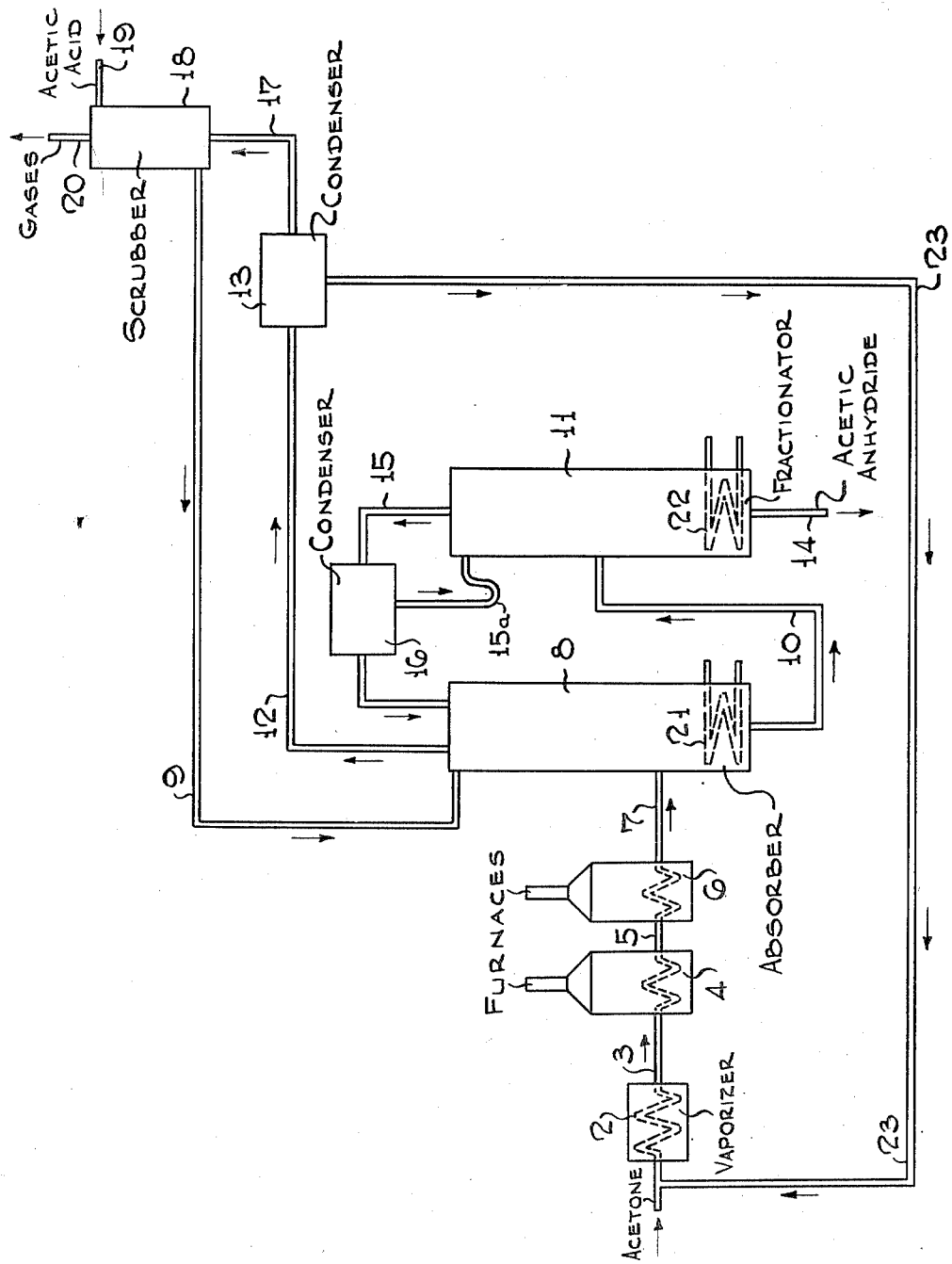

2,509,877

UNITED STATES PATENT OFFICE 2,509,877

PROCESS FOR PREPARING ACETIC ANHYDRIDE

Lloyd A. Nicolai and William G. Daroux, Baton Rouge, La., assignors to Standard Oil Development Company, a corporation of Delaware Application June 20, 1947, Serial No. 755,868

3 Claims. (Cl. 260—546)

This invention relates to improvements in the production of organic compounds of the type of ketene (CH$_2$:CO) and its homologs and to the production of acid anhydrides, such as acetic anhydride, therefrom.

Various methods for the production of ketene or its homologs are known. In general, these methods comprise cracking ketones, organic acid or acid anhydrides. For example, acetone may be cracked at high temperatures to yield ketene itself and methyl ethyl ketone may be so treated to yield a mixture of methyl ketene and ketene. The ketenes are highly reactive compounds and are used as intermediates in the production of a large number of organic compounds. For example, they may be reacted with acids to yield anhydrides, with alcohols to yield esters, etc.

A particularly valuable reaction is that of ketene itself with acetic acid to yield acetic anhydride which is useful in the preparation of cellulose esters. In this process acetone is cracked at high temperatures and at short contact times to produce ketene which is then passed countercurrently to acetic acid in a tower to produce acetic anhydride. Unreacted acetone and some acetic acid are removed overhead and acetic anhydride-acetic acid mixture is taken off the bottom. The overhead is condensed to separate acetone which may contain acetic acid from fixed gases and the acetone is recycled. However, under normal conditions of operation the yield of permanent gases (CO, CO$_2$, CH$_4$ and C$_2$H$_4$) and the vapor pressure of acetone are such that about 7.5% of the total acetone feed to the furnace is lost with the effluent gases when the acetone is condensed at 80° F. with cooling water.

It is, therefore, the main object of this invention to provide a process in which the loss of acetone in the effluent gases is minimized or entirely avoided.

Further objects of this invention will be apparent to those skilled in the art from the following description taken in connection with the drawing, which is a diagrammatic side elevation view in the nature of a flow sheet showing one form of apparatus arrangement which might be employed in carrying out this invention.

Referring more specifically to the drawing, numeral 2 represents vaporizer means for the acetone, which may be a simple coil as shown or a metal still pot or the like. The vaporizer is connected by line 3 to preheater 4 which likewise may be of simple construction, comprising merely an S-coil or the like.

The preheater is connected by conduit 5 to pyrolysis chamber 6 which may be a single tube or coil or other type of enclosed chamber. The coil may be copper or other desired alloy, such as stainless steel containing a large amount of chromium. Chamber 6 is connected by line 7 to absorption tower 8 which may be of any convenient contruction.

Tower 8 is provided with conduit means 9 for introducing acetic acid to be reacted with the ketene and with draw-off means 10 at the base of the column connected with fractionator 11. The upper part of the absorber is provided with vapor take-off means 12 connecting with condenser 13. Fractionator 11 is provided with bottom draw-off means 14 and vapor-take-off conduit 15 which passes through condenser 16 to the top of absorber 8. Condenser 13 is connected by line 17 to scrubber 18 which is provided at its top with means 19 for introducing scrubbing liquid and with vent line 20 for removing gases and connects at its bottom with line 9 into the absorber 8. Means are provided in absorber 8 and fractionator 13 for supplying heat, such as steam coils 21 and 22.

The invention may be further understood by consideration of the following more detailed description. This description is set forth for the purpose of illustrating the invention; hence it is to be understood that the specific values and materials described are not to be construed as limiting the invention.

Referring, therefore, again to the drawing, acetone is vaporized and preheated to 1150° F. in preheater 4 and then passed to pyrolyzer 6 where it is heated to a temperature of 1300° F. with a mass velocity of 25 lbs. of acetone per second per square foot to give a contact time of 0.3 to 0.5 of a second. Under these conditions, about 15% of the acetone is converted with about 80% selectivity to ketene. In order to prevent polymerization of ketene, the effluent gases from the pyrolysis chamber are immediately introduced by line 7 into the bottom of absorber 8 where they are passed countercurrent to glacial acetic acid introduced through line 9. The bottom of the absorber acts also as a soaker for the completion of the reaction between the ketene and the acetic acid, because, while ketene readily reacts with acetic acid to form the anhydride, a definite time is required before the partial pressure of the ketene above the solution is reduced to zero. The absorption tower also acts as a heat exchanger with the cold fresh acid entering through line 9 and the recycle acid from the condenser 16, absorbing the heat of reaction and further cooling the ketene vapors entering through line 7. As a result the effluent vapors in the top of the tower contact the cold product liquor entirely free of acetone and acetone will tend to concentrate somewhere in the middle section of the tower, but by reboiling any acetone that reaches the bottom of the tower by means of steam coil 21, eventually all of the acetone must leave in the top gases. A mixture of acetic acid and product acetic anhydride is removed from the bottom of the absorber through line 10 and passed to fractionator 11 where separation is effected between the acetic acid and the acetic anhydride, the former being recycled to the absorber through line 15 and condenser 16 and the latter withdrawn as product. Part of the condensate from condenser 16 is returned to fractionator 11 through line 15A for reflux.

Unconverted acetone, some acetic acid and fixed gases (largely methane, carbon monoxide and ethylene) are passed overhead from absorber 8 through line 12 to condenser 13 where the bulk of the acetone is condensed and recycled through line 23. However, under the cracking conditions cited above giving a 15% conversion of acetone with 80% selectivity to ketene, the yield of fixed gases and the vapor pressure of acetone are such that about 7.5% of the total acetone feed to the furnace is lost with the effluent gases in the usual method of water cooling. Accordingly, it is a particular feature of this invention to pass the mixture of fixed gases and acetone from the condenser by line 17 to scrubber 18 where they are contacted countercurrently with glacial acetic acid introduced by line 19. The temperature in this scrubber should be maintained as low as possible without refrigeration down to the freezing point of the acid (60° F.). While it is possible to reduce the loss of acetic acid to a minimum by increasing the pressure, other considerations, such as the optimum cracking pressure, limit the pressure to atmospheric. In any case, regardless of the pressure and at temperatures between 60° F. and 190° F., the loss of acetic acid will be less than the loss of acetone at 80° F. Thus, the practical limits of pressure and temperature in the scrubber are atmospheric to 10 lbs./sq. in. gauge, and 60° to 100° F. In order to effect the same net recovery of valuable product by refrigeration, the effluent gases would have to be chilled to −5° F.

The nature and objects of the present invention having been thus described and illustrated, what is claimed as new and useful and is desired to be secured by Letters Patent is:

1. In a process for preparing an aliphatic acid anhydride by pyrolyzing a ketone to the corresponding ketene, immediately passing the hot gaseous pyrolyzed products including the ketene, unreacted ketone, and fixed gases into an absorption zone wherein said products are contacted with acetic acid, and removing a liquid mixture of acetic acid anhydride and acetic acid from the bottom of the absorption zone, the improvement which comprises passing a vapor stream of the unreacted ketone and fixed gases substantially free of ketene, from the absorption zone to a cooling zone maintained at a temperature of at least +80° F. wherein only a portion of the ketone is condensed, recycling said condensed ketone to the pyrolysis step, passing a gaseous stream containing fixed gases and remaining uncondensed ketone vapor from the cooling zone to a scrubbing zone maintained at a pressure of from atmospheric to 10 psig. and a temperature of from 60° to 100° F. wherein said gaseous stream is contacted with liquid acetic acid introduced thereto to remove the ketone substantially completely, removing fixed gases substantially free of ketone from said scrubbing zone, removing a ketone enriched acetic acid stream from the bottom of the scrubbing zone, and passing said ketone enriched acetic acid stream to the absorption zone.

2. In a process for preparation of acetic anhydride by pyrolyzing acetone to ketene, immediately passing the total hot gaseous pyrolyzed products including the ketene, unreacted acetone, and fixed gases into an absorption zone wherein said products are contacted countercurrent with acetic acid, and removing a mixture of acetic anhydride and acetic acid from the bottom of the absorption zone, the improvement which comprises passing a vapor stream of unreacted acetone and fixed gases substantially free of ketene, from the absorption zone to a cooling zone maintained at a temperature of at least +80° F. wherein only a major portion of the ketone is liquefied, recycling said liquefied acetone to the pyrolysis step, passing a gaseous stream containing said fixed gases and remaining uncondensed acetone vapor from the cooling zone to a scrubbing zone maintained at a pressure of from atmospheric to 10 psig. and a temperature of from 60° to 100° F. wherein said gaseous stream is contacted countercurrently with a stream of acetic acid to remove the acetone substantially completely, removing fixed gases substantially free of acetone from the top of said scrubbing zone, removing an acetone enriched acetic acid stream from the bottom of the scrubbing zone, and passing said acetone enriched acetic acid stream to an upper part of the absorption zone.

3. A process such as that defined in claim 2 in which, as an additional improvement, the mixture of acetic anhydride and acetic acid from the bottom of the absorption zone is passed to a fractionating zone wherein the acetic acid is separated from the acetic anhydride and at least a part of said acetic acid is returned to an upper part of the absorption zone.

LLOYD A. NICOLAI.
WILLIAM G. DAROUX.

REFERENCES CITED

The following references are of record in the file of this patent:

UNITED STATES PATENTS

| Number | Name | Date |
|---|---|---|
| 1,898,687 | Rice | Feb. 21, 1933 |
| 1,942,110 | Law | Jan. 2, 1934 |
| 2,099,909 | Steik | Nov. 23, 1937 |
| 2,178,752 | Gleason | Nov. 7, 1939 |
| 2,232,705 | Hull | Feb. 25, 1941 |
| 2,235,561 | Nadeau et al. | Mar. 18, 1941 |